United States Patent [19]

Rozniecki

[11] Patent Number: 4,589,496

[45] Date of Patent: May 20, 1986

[54] FIRE SUPPRESSANT VALVE USING A FLOATING POPPET

[76] Inventor: Edward J. Rozniecki, 31041 Angeline, St. Clair Shores, Mich. 48082

[21] Appl. No.: 605,035

[22] Filed: Apr. 30, 1984

[51] Int. Cl.[4] ........................ A62C 37/06; F16K 31/66

[52] U.S. Cl. ........................................ 169/20; 169/22; 169/28; 137/68.2; 251/68; 251/73; 251/74; 251/900

[58] Field of Search ........................ 169/19, 20, 26, 28, 169/21, 22, 74, 33; 137/68 A, 514.5, 516.29, 533.27; 251/DIG. 1, 68, 73, 74

[56] References Cited

U.S. PATENT DOCUMENTS

| | | | |
|---|---|---|---|
| 2,357,133 | 8/1944 | Rider | 169/20 |
| 2,638,918 | 5/1953 | Perry | 251/74 X |
| 2,721,571 | 10/1955 | Gershon | 251/73 X |
| 3,075,547 | 1/1963 | Scaramucci | 137/516.29 |
| 3,530,880 | 9/1970 | Hune | 137/533.27 X |
| 3,750,755 | 8/1973 | Kramer et al. | 169/26 |
| 4,051,864 | 10/1977 | Iwatsuki | 137/514.5 X |
| 4,228,820 | 10/1980 | Deminski | 137/514.5 X |
| 4,277,031 | 7/1981 | Moumaneix et al. | 251/DIG. 1 |
| 4,423,642 | 1/1984 | Kuboichi | 251/74 X |

*Primary Examiner*—Andres Kashnikow
*Assistant Examiner*—Mary Beth O. Jones
*Attorney, Agent, or Firm*—Peter A. Taucher; Damian Porcari; Robert P. Gibson

[57] ABSTRACT

A rapid-acting fire suppressant valve that includes a linearly-movable poppet having a long stroke enabling the poppet to move beyond the suppressant flow stream. Poppet motion is initiated by venting a pre-pressurized piston-cylinder unit; ledge mechanism attached to the piston moves out of the poppet path to permit the valve-open action. The valve is characterized by redundant seal action during standby periods, and rapid poppet motion during the valve-opening operation.

2 Claims, 10 Drawing Figures

FIRE SUPPRESSANT VALVE USING A FLOATING POPPET

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to fire suppressant systems to defend against explosive type fires, e.g., in military tanks or airplanes. The invention can also be used in the suppression of other type fires characterized as "rapid growth" or "slow growth" fires, in such places as water pleasure craft, kitchens, off-the-road vehicles, oil wells, etc. The invention was devised primarily for use in explosive fire situations.

The invention is particularly concerned with a rapid-acting valve carried on the exit mouth of a pressure-resistant bottle containing pressurized fire extinguishant, such as Halon 1301. The term rapid-acting is here used to mean a valve whose valve element is enabled to move to an open condition within less than six milliseconds after the valve mechanism has first been subjected to an electrical operating signal.

Patents showing valves designed to perform the function achieved by my valve mechanism (but with greater discharge response times) are U.S. Pat. No. 3,209,937 to Hirst et al, U.S. Pat. No. 3,474,809 to Gordon, U.S. Pat. No. 3,647,109 to Hebblethwaite, U.S. Pat. No. 3,750,755 to Kramer, and U.S. Pat. No. 3,788,400 to Tufts. The patent disclosure believed to have the most similarity to my invention is the disclosure in U.S. Pat. No. 3,647,109; however that patented device uses a rupturable metal diaphragm, whereas my proposed device operates without such a diaphragm.

One object of my invention is to provide a fire suppressant valve mechanism capable of handling a relatively large cross section fire extinguishant stream, e.g., about two inch diameter, or greater.

A related object is to provide a valve mechanism that comprises a relatively large diameter valve poppet.

Another object of my invention is to provide a valve mechanism that can maintain the fire suppressant bottle in a fully pressurized condition for an extended period of time, e.g., ten years.

A further object is to provide a valve mechanism that operates without reliance on a rupturable metal diaphragm.

An additional object is to provide a valve mechanism that is openable to discharge fire extinguishant without introducing metal fragments into the flowing stream (e.g., fragments from a rupturable diaphragm).

A further object is to provide a valve mechanism that can open in a relatively short period of time, e.g., five milliseconds or less.

Another object is to provide a valve mechanism that will remain leak free and operable under widely varying ambient temperature extremes, e.g., from low arctic temperatures near sixty degrees below zero Farenheit to high desert temperatures of one hundred forty degrees above zero Farenheit.

THE DRAWINGS

Figure 1:
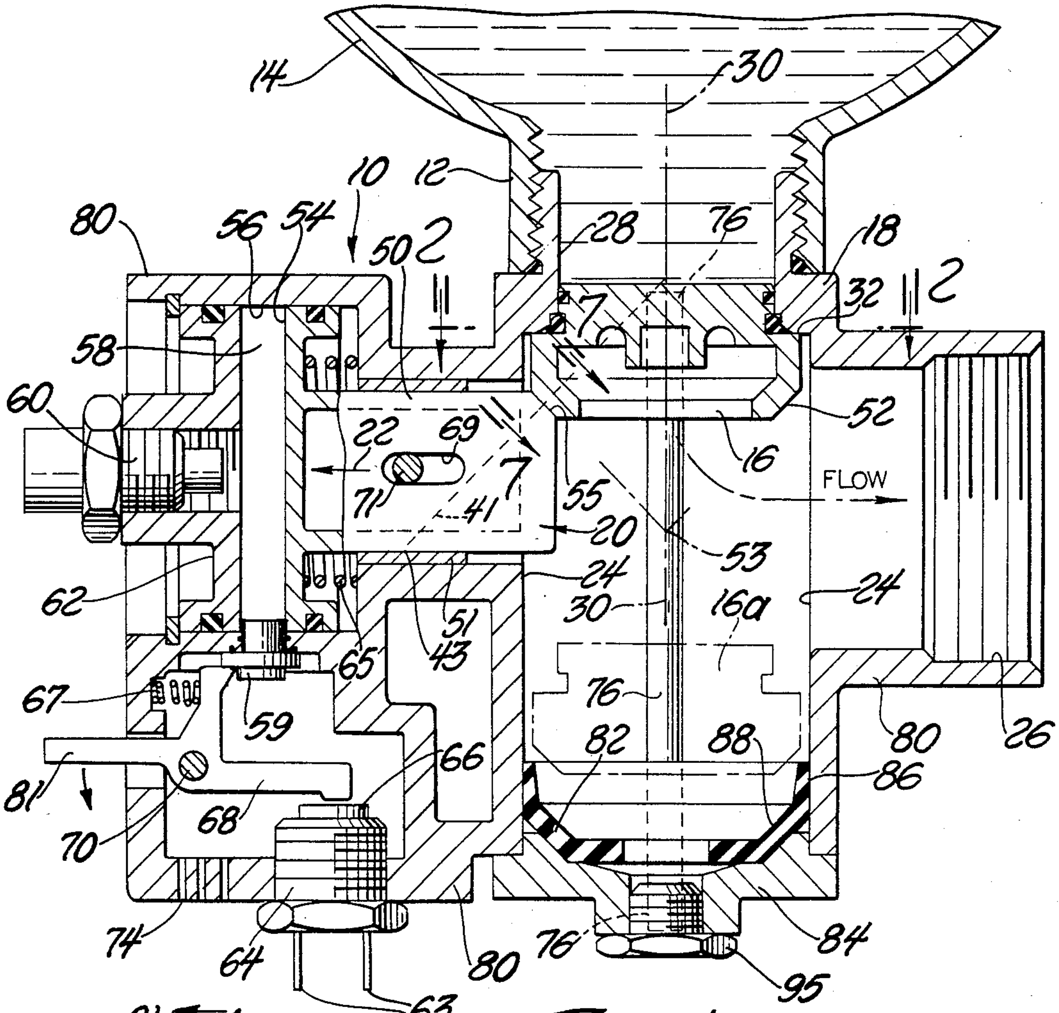
FIG. 1 is a sectional view taken through a valve mechanism embodying my invention.

Referring in greater detail to FIG. 1 there is shown a valve mechanism 10 carried on a downward neck extension 12 of a pressure-resistant bottle 14; extension 12 defines an exit port for the bottle. The space circumscribed by the bottle is occupied by a vaporizable liquid fire extinguishant, such as Halon 1301, maintained at an elevated pressure, e.g., 750 p.s.i. at 70° F., by means of a gaseous pressurizing agent such as nitrogen.

Valve mechanism 10 includes a valve poppet 16 maintained against a valve seat means 18 by a ledge means 20. Ledge means 20 is a hollow cylindrical member 50 having an angled end surface 55 underlying a frustoconical end surface 52 on poppet 16. The two members 50 and 16 exert wedge-like forces on one another. During standby periods member 50 wedges poppet 16 to its illustrated "closed" position. During the valve-opening period poppet 16 wedges member 50 leftwardly out of the poppet path.

When ledge means 20 is moved leftwardly, as designated by arrow 22, the valve poppet is automatically fired rapidly downwardly by the pressurized fire extinguishant in bottle 14; a decompression pulse generated in the extinguishant enhances poppet velocity. As the poppet moves downwardly to dashed line position 16*a* the fire extinguishant follows the poppet into cylindrical chamber 24, thence rightwardly through a threaded exit passage 26. The jet of extinguishant fluid moves directly through a non-illustrated nozzle onto the emergent fireball or through non-illustrated piping to the fireball, depending on the nature of the system.

VALVE POPPET STRUCTURE

Figure 3:
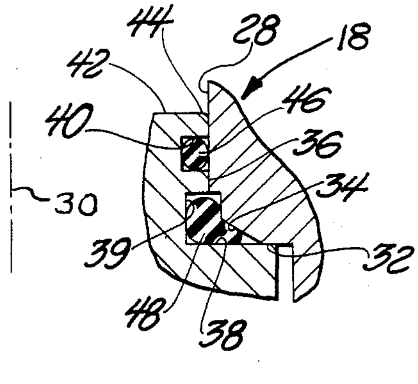
FIG. 3 is a fragmentary enlarged view of a sealing mechanism used in the FIG. 1 valve mechanism.

As best seen in FIG. 3, valve seat means 18 defines a cylindrical centering surface 28 parallel to flow axis 30 (FIG. 1) a flat stop surface 32, and a frusto-conical chamfer surface 34. Valve poppet 16 is configured to define a cylindrical pilot portion 36, and an outwardly radiating abutment surface 38. Pilot portion 36 has an annular groove 39 therein at the juncture with abutment surface 38. Pilot portion 36 also has an annular groove 40 near upper end surface 42. Upper annular edge 44 of the valve poppet is bevelled or chamfered to facilitate entry of pilot portion 36 into the space circumscribed by centering surface 28 (when the valve poppet is being installed).

A first annular elastomeric sealing element 46 is disposed within groove 40 for sealing engagement with centering surface 28. A second annular elastomeric sealing element 48 is disposed within groove 39 for engagement with chamfer surface 34. Abutment surface 38 engages stop surface 32 to limit upward motion of the poppet, and to control the compression (deformation) of sealing element 48. In its free unstressed state element 48 has a standard round o-ring cross sectional configuration. Chamfer surface 34 deforms the sealing element in a predetermined manner into its illustrated configuration. Sealing element 46 is preferably a conventional seal having a circular, tetraseal, square or rectangular cross section.

The described mechanism provides two or more sealing actions in serial arrangement between bottle 14 and chamber 24. Seal 46 acts to prevent significant leakage of liquid fire extinguishant from the bottle. Any liquid that might pass across seal 46 would vaporize because the zone immediately below seal 46 is at a relatively low pressure. Seal 48 acts to trap any vaporized extinguishant that has passed across seal 46. The aim of the sealing mechanism is to achieve minimal loss of pressurized fire extinguishant from the bottle, e.g., less than 1 ounce in six years of standby service.

VALVE OPENING MECHANISM

Valve poppet 16 is fired downwardly to position **16*a* by the pressurized compressed fire extinguishant in bottle extension 12. Such action occurs when ledge means 20 is moved leftwardly from its illustrated position. The ledge means is carried by a piston 54 that is slidably mounted within a stationary cylinder 56. During standby periods a pressurized atmosphere in space 58 biases piston 54 rightwardly, thereby keeping ledge means 20 in its illustrated position supporting valve poppet 16** in the closed position.

When space 58 is vented to atmosphere (by downward movement of plug 59) poppet 16 forces ledge means 20 to move leftwardly; the poppet moves downwardly from its closed position. Downward motion of poppet 16 is promoted by two cooperating actions, namely decompression of the pressurized fire extinguishant and the bottle pressure. Poppet motion is very rapid, e.g., less than one millisecond to reach the dashed line position.

POPPET-LEDGE RELATION

Ledge means 20 is defined by a hollow cylindrical member 50 carried by piston 54. Bevelled end area 55 of member 50 in contact with valve poppet 16 is machined at the same angle as poppet surface 52, such that members 50 and 16 have line contact with one another (in FIG. 1). As seen in FIG. 1, the contact angle between the poppet end surface 52 and member 50 end surface 55 is approximately forty five degrees; the contact surfaces are on an imaginary line passing through imaginary point 53 on poppet centerline 30.

Figure 7:
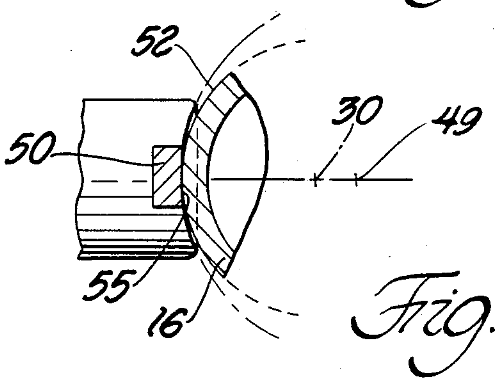
FIG. 7 is a fragmentary sectional view on line 7—7 in FIG. 1.

Poppet surface 52 is a frusto-conical surface centered on axis 30 (FIG. 7). Surface 55 is a concave surface centered on imaginary point 49. The difference in curvature between surfaces 52 and 55 reduces the so-called "Hertzian" breakout compressive stresses tending to cause sticking of the surfaces at the moment of valve opening.

At the start of valve-opening action poppet surface 52 exerts a force on member 50 normal to the line of contact 52,55. The force vector represented by imaginary line 41 passes through a point 43 on bearing surface 51 that is midway between the ends of the bearing surface. This relationship minimizes the tendency of member 50 to become cocked in the bearing or to be frictionally retarded by the bearing.

The assembly comprised of members 54 and 50 is non-rotatable. Slots 69 are formed in member 50, and a stationary pin 71 is mounted in the valve housing, for the purpose of preventing the piston-ledge assembly from rotating on its movement axis.

As shown in FIG. 1, the engagement angle between members 50 and 16 is forty five degrees. This angle can be varied while still practicing the invention. If the engagement angle is made to be considerably more nearly horizontal (i.e., ninety degrees relative to axis 30) the poppet force component on member 50 may be predominately in the vertical direction rather than in the desired horizontal direction. If the engagement angle is made to be more nearly vertical (i.e., nearer zero degrees relative to axis 30) a comparatively high gaseous pressure will be required in space 58 in order to retain member 50 in its poppet-engaged position. An engagement angle of approximately forty five degrees is preferred.

PRESSURIZATION OF SPACE 58

Space 58 may be initially pressurized via a conventional filler valve 60 carried on cylinder end wall 62. Preferred pressurizing gas is nitrogen or similar diatomic gas having desired characteristics of chemical inertness, non-condensability and inability to flow through normal clearance spaces closed by conventional o-ring seals. Preferred charging pressure is about two times the extinguishant pressure in bottle 14.

During standby periods space 58 is entirely closed. Sealing plug 59 prevents escape of the pressurizing gas from space 58. Plug 59 preferably projects into space 58 in close proximity to the left face of piston 54, whereby partial decompression of space 58 is ineffective to significantly disengage member 20 from poppet 16. Members 20 and 16 may move slightly, but not enough to set up a leakage condition across seals 46 and 48. At the time of valve actuation plug 59 moves out of the path of piston 54.

Figure 8:
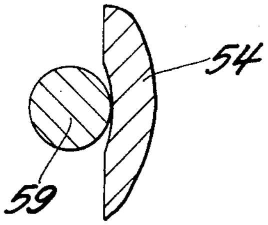
FIG. 8 is a sectional view taken through a construction detail used in the FIG. 1 embodiment.

As best seen in FIG. 8, the face area of piston 54 engaged with plug 59 may have a concave depression machined therein; the radius of curvature of the depression surface is slightly greater than the plug radius of curvature, such that any deformation of the piston surface by the plug increases the area of contact so as to lessen the unit area pressure.

Plug 59 preferably has redundant sealing engagement with the valve housing, similar to that used for poppet 16. A first seal encircles the cylindrical portion of the plug. A second seal is arranged between the plug flange and the lower face of the associated housing wall.

The plug is retained in place by an upstanding arm on bell crank 68. The end surface of the upstanding arm may be contoured so that the arm exerts a wedge action on the associated plug surface; a suitable spring 67 retains the bell crank in its illustrated position.

When a step voltage signal is applied across terminals 63 of an explosive squib cartridge 64 the cartridge end wall 66 is driven upwardly, thereby swinging bell crank 68 in a counterclockwise direction around axis 70. The free end of the bell crank moves out of engagement with the end surface of plug 59, enabling the pressure in space 58 to drive the plug downwardly. Space 58 is thus depressurized through the hole vacated by plug 59; time required is about one millisecond. Vent holes 74 (or a relief valve, not shown) have sufficient flow area to prevent any appreciable pressure buildup in the bell crank chamber.

The face area of piston 54 is preferably about twice the area of poppet 16 exposed to the pressurized extinguishant in bottle 14. Therefore, when squib 64 is detonated to allow plug 59 to depressurize space 58 there is a substantial drop in the total force holding members 54 and 50 in the poppet-obstruct position. The poppet is thus able to rather easily and quickly move members 50 and 54 in a leftward direction. A light compression spring 65 prevents excessive rebound of piston 54 in a left-to-right direction. In the event that squib 64 fails to fire it is possible to operate the valve by manually depressing a thumb actuator 81 (constructed as part of bell crank 68) in a counterclockwise direction.

VALVE POPPET GUIDANCE

Figure 2:
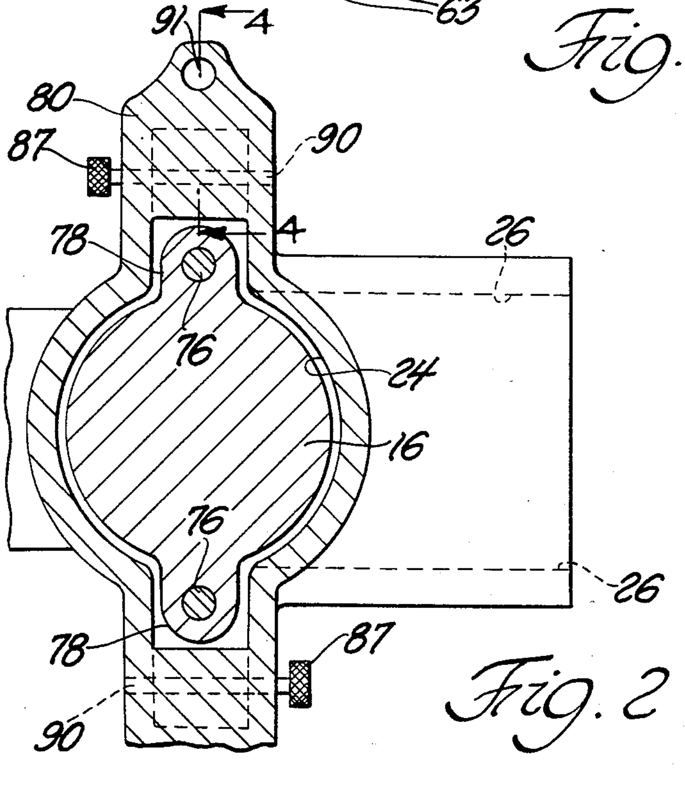
FIG. 2 is a fragmentary sectional view taken on line 2—2 in FIG. 1.

Valve poppet 16 has linear motion at a very high rate of speed during the valve-opening operation (e.g., two hundred feet per second). It is desirable that the poppet be guided in a positive manner during such rapid opening movements in order to prevent cocking of the poppet, or movement of the poppet to a flow-obstructing position. Guidance of the poppet is also necessary to prevent breakage of the poppet, which could introduce fragments into the flow stream. FIGS. 1 and 2 show a poppet guidance means that includes two spaced elongated guide rods 76 immovably positioned in valve housing 80. Cooperating extensions or ears 78 are carried by the valve poppet for slidable engagement with the guide rods. The rods are oriented on an imaginary straight line parallel to the poppet centerline 30. Housing structure 80 is suitably configured to accommodate rods 76 and extension ears 78.

The high rate of speed achieved by poppet 16 during its downward (opening) movement poses a rebound problem. Rebound motion (in an upward direction) is very undesirable in that the poppet could be put in an intermediate position wholly or partially obstructing flow from chamber 24 into exit passage 26. To minimize or prevent rebound I propose two mechanisms. One of the mechanisms comprises a cup-shaped resilient snubber member operable to grip the poppet as it reaches the limit of its downstroke, thereby somewhat reducing the rebound effect. The other mechanism comprises two similarly formed swingable detents. During downward motion of the poppet the poppet deflects each detent to a non-obstruct condition; thereafter a high spring rate spring swings each detent to an obstructing position preventing further motion of the poppet valve in the rebound direction.

FIG. 1 shows a resilient cup-shaped snubber member 82 seated on lower end enclosure 84 of the valve housing in the path of poppet valve 16. Member 82 is formed of a low durometer elastomeric material. The mouth of member 82 has a diameter slightly larger than the valve poppet diameter, whereby the poppet can enter into the defined concavity in member 82. Side wall 86 of the resilient member has its internal surface tapering inwardly, such that the tapering surface tends to grip the poppet side surface, thereby declerating the poppet as it nears the limit of its downward movement. Bottom wall 88 of member 82 absorbs some of the velocity energy to further decelerate the poppet.

Figure 4:
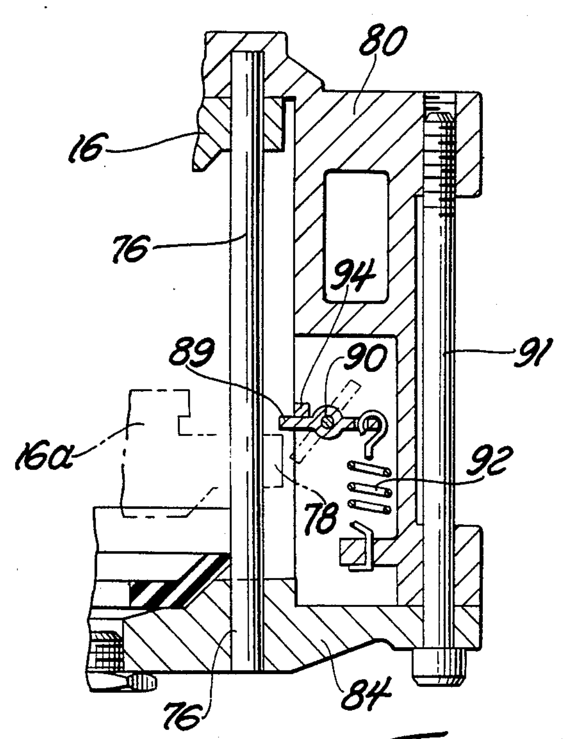
FIG. 4 is a fragmentary sectional view taken on line 4—4 in FIG. 2.

Member 82 will probably not be effective to completely prevent rebound motion of the poppet. Rebound movement is limited by two similarly-formed detent mechanisms, one of which is shown in FIG. 4. Each detent mechanism comprises a detent arm 89 swingable on a transverse pivot pin 90. Tension spring 92 normally swings the arm in a clockwise direction into contact with a stop means 94. During downward motion of the poppet the arm is deflected to the dashed line position. Spring 92 is of sufficient pre-load and high spring rate to swing the arm back to the full line position while the poppet is undergoing a shift in direction, i.e., from downward motion to upward rebound motion. Arm 89 then limits poppet rebound motion to the dashed line position.

End enclosure 84 is fastened to the valve housing by two or more elongated bolts 91 (FIGS. 2 and 4). These bolts absorb energy incident to impaction of poppet valve 16 against member 82. Use of elongated bolts is recommended to avoid breakage of the bolts. To the extent that the bolts absorb impact energy they minimize poppet rebound action. In this sense the elongated bolts may be considered to be anti-rebound devices.

Poppet 16 can be reset to its closed position by any suitable means. For example, thumbscrews 87 (FIG. 2) can be turned manually to move detents 89 to non-obstruct positions. Meanwhile threaded plug 95 (FIG. 1) can be removed from end closure 84 to enable a non-illustrated push rod to be inserted upwardly against poppet 16. The push rod can be used to move the poppet to the closed position, while space 58 is being repressurized. This resetting operation would be used only during bottle-recharge operations.

DESIGN VARIATIONS

Figure 5:
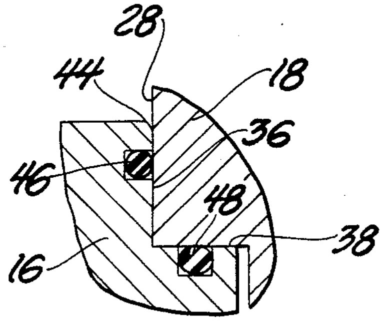
FIGS. 5, 6, 9 and 10 are fragmentary views of construction details usable as alternates to structural features in the FIG. 1 mechanism.
Figure 6:
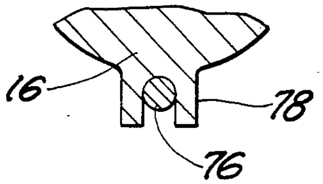

Certain design features can be varied while still practicing the invention. For example the poppet sealing system can be constructed as shown in FIG. 5. Similarly the poppet guidance extensions can be configured as shown in FIG. 6.

Figure 9:
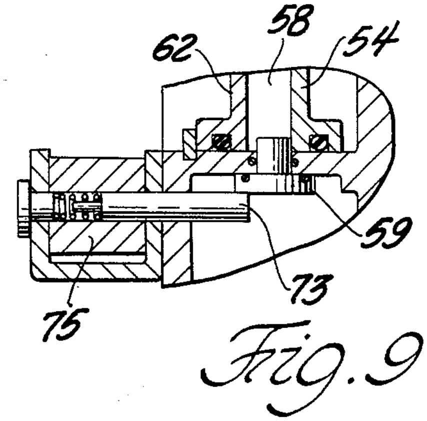

FIG. 9 illustrates the use of a solenoid to retain plug 59 in its closed position. Plunger 73 underlies the plug flange to hold plug 59 in position. When a step voltage is applied to solenoid winding 75 plunger 73 is drawn leftwardly such that the high gaseous pressure in space 58 blasts plug 59 out of the associated vent opening.

Figure 10:
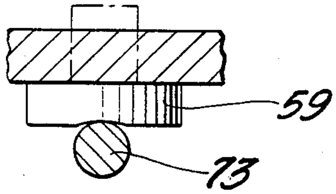

FIG. 10 illustrates a structural detail used to minimize frictional effects between plunger 73 and the plug flange. A slight concavity is formed in the flange face so that deformation of the plug flange due to high pressures on the plug upper end results in an increase in contact area, with appreciable reduction in frictional drag. Friction depends on PV where P is unit area force and V is velocity (feet per second). By reducing the unit area force it is possible to reduce drag.

FEATURES OF THE INVENTION

It will be noted that the illustrated valve operates without a rupturable metal diaphragm, as used for example in the arrangement disclosed in U.S. Pat. No. 3,762,479. Such rupturable diaphragms can only be formed as relatively small diameter devices unless special reinforcement devices are employed, as shown for example in U.S. Pat. No. 3,209,937 to Hirst et al. The use of a rigid valve poppet alone, as proposed herein, enables the valve to be formed as a relatively large diameter device without need for external reinforcement. A large diameter valve device advantageously permits the bottle and the bottle neck to be relatively large, so that the bottle contents can be discharged in a relatively short period of time. This contributes to better treatment of potentially larger, more extensive, fireballs.

Rapid discharge of the fire extinguishant is promoted by a relatively long but rapid poppet valve stroke (so that the poppet quickly moves beyond or out of the flow path). In my proposed system the elongated guidance rods 76 contribute to a lengthened poppet stroke. The resilient snubber 82, detent mechanisms 89 and elongated fastener bolts 91 limit rebound motion of the poppet as might otherwise cause the rigid poppet to return to a flow-obstructing position.

The use of a rigid poppet valve, in lieu of a rupturable diaphragm, is advantageous in that no metal fragments are generated in the extinguishant flow stream. Such fast-flowing fragments can be a source of danger to personnel in the path of the extinguishant stream.

The proposed valve system uses a pre-pressurized power source 58 for triggering the poppet valve into motion. The pressurized source is already at a high pressure at the instant when squib 64 is ignited. There is no requirement for building up an operating pressure. It is believed that such use of a pre-pressurized source will somewhat shorten the response time of the valve mechanism, thus contributing to a faster discharge of the bottle contents for improved treatment of explosive fires or rapid growth fires.

The proposed system uses a relatively large area piston 54 (approximately twice the area of poppet 16). However, the venting action is controlled by a relatively small plug 59. Therefore squib 64 (or solenoid 75) can be relatively small while still producing a large total (negative) operating force.

The proposed poppet valve uses two sealing elements 46 and 48 in series with one another. This redundancy offers increased assurance of a bottle-pressurized condition for prolonged standby periods, e.g., five years or more. The redundant seals can be compressed similar amounts around the poppet perimeter because the poppet moves linearly; this is in contrast to the swinging motion used in the aforementioned U.S. Pat. No. 3,647,109. The linear type motion enables pilot portion 36 to have a relatively close fit in centering surface 28, without interference with the passage wall during valve-opening operations.

I wish it to be understood that I do not desire to be limited to the exact details of construction shown and described for obvious modifications will occur to a person skilled in the art, without departing from the spirit and scope of the appended claims.

I claim:

1. In a fire suppressant system comprising a bottle having an exit port, pressurized fire extinguishant within the bottle, and a valve mechanism for controlling extinguishant flow out of the bottle through the exit port: wherein the improvement comprises a valve seat means defining a cylindrical centering surface; a flat stop surface; a floating valve poppet having a cylindrical pilot portion slidable into the cylindrical centering surface, and an outwardly radiating abutment surface engageable with the stop surface to limit motion of the poppet toward the bottle;

a first elastomeric sealing element carried by the pilot portion of the valve poppet for engagement with the cylindrical centering surface, and a second elastomeric sealing element carried by the abutment surface for engagement with a portion of the flat stop surface; said poppet engaging the seat means to prevent flow through the exit port, said poppet being slidably mounted for movement directly away from the seat means to permit the pressurized extinguishant to flow through the port; ledge means comprising a ledge surface that is engaged with the poppet at an acute angle to the plane of the flat stop surface, whereby the ledge means normally biases the poppet into tight engagement with the valve seat means; a piston means movable transverse to the line of motion of the poppet to withdraw the ledge means from its normal position engaged with the poppet; means for operating the piston, said piston-operating means comprising a closed cylinder slidably supporting the piston, a pressurized gas within the cylinder normally biasing the piston in a direction wherein the ledge means supports the poppet in its closed position, and means for venting pressurized gas from the closed cylinder whereby the piston then moves in a direction to draw the ledge means away from the poppet; means limiting movement of the valve poppet in a direction away from the valve seat means; said movement limiting means including a resilient cup-shaped member arranged with its concavity facing the valve poppet; the mouth of the cup-shaped member having a diameter slightly larger than the valve poppet diameter; the internal diameter of the cup-shaped member tapering slightly when measured from the mouth, whereby the resilient side wall of the cup-shaped member tends to grip the side surface of the poppet and thereby minimize the tendency of the poppet to rebound out of the cup-shaped member; and a detent mechanism arranged in the path of the valve poppet to limit rebound motion thereof; said detent mechanism being deflectable by the valve poppet to permit motion thereof away from the valve seat means but thereafter being automatically movable to a position obstructing rebound motion of the poppet toward the valve seat means.

2. In a fire suppressant system comprising a bottle having an exit port, pressurized fire extinguishant within the bottle, and valve mechanism for controlling extinguishant flow out of the bottle through the exit port, the improvement wherein said valve mechanism comprises:

a valve seat means defining a cylindrical centering surface, and a flat stop surface;

a floating valve poppet having a cylindrical pilot portion slidable in said cylindrical centering surface, and an outwardly radiating abutment surface engageable with said stop surface to limit motion of the poppet toward the bottle and prevent flow through the exit port, the juncture between the cylindrical centering surface and the flat stop surface includes a chamfer surface extending at an acute angle to the flat stop surface, the juncture between the cylindrical pilot portion and abutment surface including an annular groove; a first elastomeric sealing element carried by the pilot portion of the valve poppet for engagement with the cylindrical centering surface, and a second elastomeric sealing element being retained in said annular groove for engagement with said chamfer surface when the valve poppet is seated on the valve seat means;

means for guiding the valve poppet while it is moving away from the valve seat means; said guide means including two spaced elongated guide rods immovably positioned in the valve mechanism, and cooperating extensions carried by the valve poppet for slidable engagement on the guide rods; said guide rods being oriented on an imaginary straight line parallel to the poppet centerline 30;

a ledge means engaged with the poppet to forcibly retain same in its closed position against the valve seat means; said ledge means including a ledge surface that is engaged with the poppet at an acute angle to the plane of the stop surface, whereby the ledge means normally biases the poppet into tight engagement with the valve seat means;

a rapid-acting means movable transverse to the line of motion of the poppet to withdraw the ledge means from its normal position engaged with the poppet; said rapid-acting means comprising a piston-cylinder means defining a ventable chamber 58, pressurized nitrogen gas occupying said ventable chamber, and electrically-operated means for venting said chamber; said piston has a cross-sectional area substantially greater than the area of the valve poppet exposed to pressurized fire extinguishant;

means limiting movement of the valve poppet in a direction away from the valve seat means; said movement limiting means including a resilient cup-shaped member arranged with its concavity facing the valve poppet; the mouth of the cup-shaped member having a diameter slightly larger than the valve poppet diameter; the internal diameter of the cup-shaped member tapering slightly when measured from the mouth, whereby the resilient side wall of the cup-shaped member tends to grip the side surface of the poppet and thereby minimize the tendency of the poppet to rebound out of the cup-shaped member;

a detent mechanism arranged in the path of the valve poppet to limit rebound motion thereof; said detent mechanism being deflectable by the valve poppet to permit motion thereof away from the valve seat means but thereafter being automatically movable to a position obstructing rebound motion of the poppet toward the valve seat means; said detent mechanism comprising an arm swingable on an axis transverse to the direction of valve poppet motion, spring means urging the arm to a position extending into the valve poppet path, and stop means contacted by the arm; the arm being oriented to the stop means so that when the poppet is moving away from the valve seat means the poppet swings the arm in one direction away from the stop means, after which the spring means swings the arm in the opposite direction back against the stop means; said arm being engaged with the stop means when the poppet is rebounding, whereby the arm prevents continued rebound motion after the poppet engages the arm.

* * * * *